(12) United States Patent
Coursol

(10) Patent No.: US 10,121,609 B2
(45) Date of Patent: Nov. 6, 2018

(54) KILL SWITCH

(71) Applicant: Michel Coursol, Mirabel (CA)

(72) Inventor: Michel Coursol, Mirabel (CA)

( * ) Notice: Subject to any disclaimer, the term of this patent is extended or adjusted under 35 U.S.C. 154(b) by 0 days.

(21) Appl. No.: 15/297,826

(22) Filed: Oct. 19, 2016

(65) Prior Publication Data
US 2018/0047523 A1    Feb. 15, 2018

(30) Foreign Application Priority Data

Oct. 20, 2015    (GB) .................. 1518569.7

(51) Int. Cl.
| | | |
|---|---|---|
| *H01H 3/02* | (2006.01) | |
| *B60K 28/00* | (2006.01) | |
| *A01D 69/00* | (2006.01) | |
| *B60K 17/28* | (2006.01) | |
| *A01B 71/06* | (2006.01) | |
| *H01H 3/12* | (2006.01) | |
| *B60K 25/00* | (2006.01) | |
| *H01H 27/00* | (2006.01) | |
| *B60K 28/04* | (2006.01) | |

(52) U.S. Cl.
CPC ........... *H01H 3/0226* (2013.01); *A01B 71/06* (2013.01); *A01D 69/002* (2013.01); *B60K 17/28* (2013.01); *B60K 25/00* (2013.01); *B60K 28/00* (2013.01); *H01H 3/12* (2013.01); *B60K 28/04* (2013.01); *B60W 2300/152* (2013.01); *H01H 27/00* (2013.01)

(58) Field of Classification Search
CPC ........ H01H 3/0226; H01H 3/12; H01H 27/00; B60K 17/28; B60K 25/00; B60K 25/02; B60K 25/05; B60K 28/00; B60K 28/04; A01D 69/002; A01B 71/06; A01B 71/063; A01B 71/08; B60W 2300/152

See application file for complete search history.

(56) References Cited

U.S. PATENT DOCUMENTS

| | | | | |
|---|---|---|---|---|
| 2,722,575 A | * | 11/1955 | Dobkins ................ | B60K 28/04 180/273 |
| 2,725,947 A | * | 12/1955 | Dooley .................. | B60K 28/04 180/272 |
| 3,654,411 A | * | 4/1972 | Wohnlich ............... | H01H 27/04 200/51.1 |

(Continued)

FOREIGN PATENT DOCUMENTS

GB    2442700    10/2006

*Primary Examiner* — Laura Freedman

(57) ABSTRACT

A kill switch including a switch assembly. When the switch assembly moves from a switch first configuration to a switch second configuration with the switch assembly operatively connected to a controller of a tractor, a kill electrical signal is provided to the controller to stop the tractor powering a power take-off thereof. A cord is securable to the switch assembly and to the piece of machinery to extend along a rotary drive shaft between the tractor and the piece of machinery. A switch actuating element extends from the cord, the switch actuating element being removably securable to the switch assembly. In the switch first configuration with the switch actuating element secured to the switch assembly, the switch actuating element maintains the switch assembly in the switch first configuration. When the switch actuating element is removed from the actuating element receiving portion, the switch assembly moves to the switch second configuration.

24 Claims, 4 Drawing Sheets

(56) References Cited

U.S. PATENT DOCUMENTS

| | | | | |
|---|---|---|---|---|
| 3,689,717 | A * | 9/1972 | Westenhaver | H01H 3/0226 200/61.19 |
| 3,691,330 | A * | 9/1972 | Hollander | H01H 3/0226 188/112 R |
| 3,760,134 | A * | 9/1973 | McCray | H01H 3/0226 200/52 R |
| 3,821,504 | A * | 6/1974 | Schomaker et al. | B60K 28/04 200/318 |
| 4,037,683 | A | 7/1977 | LeBell | |
| 4,317,500 | A | 3/1982 | Bening | |
| 4,335,762 | A * | 6/1982 | Reaume | B27L 7/04 144/193.1 |
| 4,337,841 | A * | 7/1982 | Law | F16P 3/12 180/271 |
| 4,651,018 | A | 3/1987 | Peterson, Jr. | |
| 4,663,984 | A | 5/1987 | Taylor | |
| 4,762,968 | A * | 8/1988 | Hilton | B60K 28/04 200/52 R |
| 4,795,957 | A | 1/1989 | MacNeal, Jr. | |
| 5,171,171 | A | 12/1992 | Tani | |
| 5,311,961 | A | 5/1994 | Stabenow | |
| 5,593,330 | A | 1/1997 | Kobayashi | |
| D391,528 | S | 3/1998 | Pingel et al. | |
| 6,352,045 | B1 | 3/2002 | Takashima | |
| 6,386,303 | B1 | 5/2002 | Zibuschka et al. | |
| 6,407,353 | B1 * | 6/2002 | Fritzinger | B60D 1/28 200/334 |
| 7,198,527 | B2 | 4/2007 | Shirayanagi | |
| 7,201,619 | B1 * | 4/2007 | Viggiano | B63C 9/0005 440/1 |
| 7,337,866 | B2 | 3/2008 | Nishi et al. | |

\* cited by examiner

KILL SWITCH

FIELD OF THE INVENTION

The present invention relates generally to the field of safety devices, and, more particularly, to a kill switch.

BACKGROUND

Lanyard kill switch devices are safety devices well known for allowing an operator to interrupt in an emergency, for example, the operation of a working equipment. For example, a typical context of use of such known lanyard kill switch devices, and which particularly concerns the present invention, is a working equipment operatively coupled to a power source through a mechanical transmission means. Lanyard kill switch devices generally include an electrical switch assembly and a lanyard assembly. For example, the equipment is represented by a wood chipper, a log saw, or the like, operatively coupled to the power take-off (PTO) of a farm tractor through a rotating drive shaft.

The electrical switch assembly is typically attached to the power source and its output contacts are suitably electrically coupled to a control circuit thereof. The lanyard assembly includes a flexible lanyard having a first end provided with a release member adapted for releasably engaging the electrical switch assembly, and the other end attached to a portion of the working equipment. The lanyard kill switch device is thus attached between the power source and the working equipment such that the lanyard is substantially linearly stretched along a path extending transversely between a typical operating position of the operator and the mechanical transmission means.

Thus, in an emergency, the operator standing next to the rotating drive shaft only needs to pull on the lanyard in order to stop its operation. Alternatively, if the operator is wounded or falls suddenly ill and inadvertently trips on the lanyard, the power source that rotates the drive shaft is at least electrically switched off.

However, the power source and/or the working equipment, particularly the relatively old ones such as farm tractors with a power take off (PTO) and old farm equipment powered through a mechanical transmission means, generally do not have a lanyard kill switch device pre-installed by the manufacturer. The lanyard kill switch devices available on the market are generally represented by an assembly of highly customized and/or complex components, which, consequently, results in a relatively high market price and installation cost.

Furthermore, these lanyard kill switch devices are generally designed to be actuated when the release member is pulled away substantially linearly within a predetermined angle range relative to the electrical switch assembly. In other words, the lanyard attached to the release member must be sufficiently linearly stretched between the switch assembly and its anchor point on the working equipment in order to pull the release member therefrom within that predetermined angle range when a hand or limb pulls down or falls transversally across the stretched lanyard. Outside this predetermined angle range, such as when the lanyard is not stretched enough or, for some reasons, the working equipment has somehow got closer to the power source, a relatively more energetic pull down on the lanyard is required since the release member needs to be forcibly pried away at a relatively more acute angle from the switch assembly than the predetermined angle.

Thus, when the lanyard is pulled on at an angle that is outside this predetermined angle range, for example, by the back of a hand of an operator that lands softly on a loosened lanyard due to a loss of consciousness, the release member may not be pulled away from the switch assembly due to the relative acute angle value of the pull angle with respect to the switch assembly. Hence, the working equipment may continue to operate unsupervised with the ensuing safety issues that may arise from such a situation.

Against this background, there exists a need in the industry to provide an improved kill switch. An object of the present invention is therefore to provide such a kill switch.

SUMMARY OF THE INVENTION

In a broad aspect, the present invention provides a kill switch for a tractor, the tractor having a power take-off, the tractor being connected to a piece of machinery through a rotary drive shaft extending between the piece of machinery and the power take-off, the tractor being provided with a controller operable between an active state and an inactive state, wherein, in the active state, power is provided to the power take off, and, in the inactive state, the power take off is unpowered, the controller being operative for switching from the active state to the inactive state upon reception of a kill electrical signal, the kill switch comprising: a switch assembly including an actuating element receiving portion and first and second electrical terminals each connectable to the controller, the switch assembly being operable between switch first and second configurations, wherein, when the switch assembly moves from the switch first configuration to the switch second configuration with the switch assembly operatively connected to the controller, variations in impedance between the first and second electrical terminals are created, the variation in impedance causing the kill electrical signal to be provided to the controller; a control element, the control element including a cord securable to the piece of machinery and to the switch assembly so as to extend along the rotary drive shaft in a substantially parallel and spaced apart relationship relative thereto, and a switch actuating element extending from the cord, the switch actuating element being removably securable to the actuating element receiving portion; wherein, when the switch assembly is in the switch first configuration and the switch actuating element is secured to the actuating element receiving portion, the switch actuating element maintains the switch assembly in the switch first configuration, and when the switch actuating element is removed from the actuating element receiving portion, the switch assembly moves to the switch second configuration, the switch actuating element being removable from the actuating element receiving portion by pulling with the cord.

The invention may also provide a kill switch wherein the switch assembly includes a housing, the housing including a housing first portion, a housing second portion and a link member extending therebetween, the housing first portion being mountable to the tractor and the housing second portion including the actuating element receiving portion, the link member being configured and sized so that the housing first and second portions are movable relative to each other.

The invention may also provide a kill switch wherein the link member is substantially flexible.

The invention may also provide a kill switch wherein the link member includes a coil spring.

The invention may also provide a kill switch wherein the link member is pivotally mounted to at least one of the housing first and second portions.

The invention may also provide a kill switch wherein the housing second portion includes a bore defining substantially opposed bore first and second ends, the bore being open at the bore first end, the switch assembly further including a switch element provided at the bore second end and extending electrically between the first and second electrical terminals, the switch element being movable between open and closed configurations in which the first and second electrical terminals are respectively electrically disconnected from each other and connected to each other by the switch element; and an actuating member inserted in the bore and protruding therefrom at the bore first end, the actuating member being axially movable along the bore between actuating member first and second positions, the actuating member being in the actuating member first and second positions when the switch assembly is in the switch first and second configurations respectively, the switch element either moving from the open configuration to the closed configuration or from the closed configuration to the open configuration when the actuating member moves from the actuating member first position to the actuating member second position; the actuating member defining the actuating element receiving portion, the actuating element receiving portion being outside of the bore in the actuating member first position.

The invention may also provide a kill switch wherein the switch element is a push button switch actuated when the actuating member moves from the actuating member first position to the actuating member second position.

The invention may also provide a kill switch wherein the actuating member is biased towards the actuating member second position, the switch actuating element extending across the bore when the switch actuating element is secured to the actuating element receiving portion.

The invention may also provide a kill switch wherein the switch actuating element is configured and sized so that a predetermined minimal pulling force is required to remove the switch actuating element from the actuating element receiving portion.

The invention may also provide a kill switch wherein the switch actuating element includes a spring pin defining a pair of legs, the actuating element receiving portion being inserted between the legs when the switch actuating element is operatively secured thereto.

The invention may also provide a kill switch wherein the actuating element receiving portion defines a substantially annular recess received between the legs when the switch actuating element is operatively secured to the actuating element receiving portion.

The invention may also provide a kill switch wherein the spring pin is an R-spring pin.

The invention may also provide a kill switch wherein the legs each define a beveled free end.

The invention may also provide a kill switch wherein the switch actuating element includes an actuating element main portion and a pair of legs each extending from the actuating element main portion, each leg being substantially rectilinear, at least one of the legs being provided with protrusion extending therefrom, the actuating element receiving portion being between the protrusion and the actuating element main portion when the switch actuating element is operatively secured to the actuating element receiving portion.

The invention may also provide a kill switch wherein the cord is substantially non-stretchable.

The invention may also provide a kill switch wherein the cord is provided with an attachment opposed to the switch actuating element, the attachment being removably attachable to the piece of machinery.

In another broad aspect, the invention provides, in combination: a tractor, the tractor having a power take-off, the tractor being provided with a controller operable between an active state and an inactive state, wherein, in the active state, power is provided to the power take off, and, in the inactive state, the power take off is unpowered, the controller being operative for switching from the active state to the inactive state upon reception of a kill electrical signal; a piece of machinery; a rotary drive shaft extending between the piece of machinery and the power take-off for transmitting power from the power take-off to the piece of machinery; and a kill switch including: a switch assembly including an actuating element receiving portion and first and second electrical terminals each electrically connected to the controller, the switch assembly being operable between switch first and second configurations, wherein, when the switch assembly moves from the switch first configuration to the switch second configuration with the switch assembly operatively connected to the controller, the kill electrical signal is generated across the first and second electrical terminals; and a control element, the control element including a cord secured to the piece of machinery and to the switch assembly so as to extend along the rotary drive shaft in a substantially parallel and spaced apart relationship relative thereto, and a switch actuating element extending from the cord, the switch actuating element being removably secured to the actuating element receiving portion; wherein, when the switch assembly is in the switch first configuration and the switch actuating element is secured to the actuating element receiving portion, the switch actuating element maintains the switch assembly in the switch first configuration, and when the switch actuating element is removed from the actuating element receiving portion, the switch assembly moves to the switch second configuration, the switch actuating element being removable from the actuating element receiving portion by pulling with the cord.

The invention may also provide a combination wherein the switch assembly includes a housing, the housing including a housing first portion, a housing second portion and a link member extending therebetween, the housing first portion being mounted to the tractor and the housing second portion including the actuating element receiving portion, the link member being configured and sized so that the housing first and second portions are movable relative to each other.

The invention may also provide a combination wherein the piece of machinery is selected from the set consisting of a wood chipper, a log saw and a continuous harvester.

The invention may also provide a combination wherein the piece of machinery includes moving parts distinct from the rotary drive shaft exposed to the environment through at least one of side, top and rear portions of the piece of machinery, the cord further extending along the piece of machinery along the moving parts, the cord being attached to the piece of machinery at an attachment location with the cord being movable relative to the piece of machinery between the attachment location and the actuating element receiving portion, the attachment location being further away from the housing along the cord than the moving parts.

The invention may also provide a combination wherein the cord is inserted through at least one guiding loop extending from the piece of machinery between the attachment location and the switch assembly, the cord being slidable relative to the at least one guiding loop.

The invention may also provide a combination wherein the housing includes a bore defining substantially opposed bore first and second ends and a bore axis extending therebetween, the bore being open at the bore first end, the switch assembly further including a switch element provided at the bore second end and extending electrically between the first and second electrical terminals, the switch element being movable between open and closed configurations in which the first and second electrical terminals are respectively electrically disconnected from each other and connected to each other by the switch element; and an actuating member inserted in the bore and protruding therefrom at the bore first end, the actuating member being axially movable along the bore between actuating member first and second positions, the actuating member being in the actuating member first and second positions when the switch assembly is in the switch first and second configurations respectively, the switch element either moving from the open configuration to the closed configuration or from the closed configuration to the open configuration when the actuating member moves from the actuating member first position to the actuating member second position; the actuating member defining the actuating element receiving portion, the actuating element receiving portion being outside of the bore in the actuating member first position; the housing being mounted to the tractor so that the bore axis is substantially parallel to the rotary drive shaft; the cord being offset from the bore axis and extending generally parallel thereto substantially adjacent the switch actuating element.

The invention may also provide a combination wherein the cord is provided with an attachment opposed to the switch actuating element, the attachment being attached to the piece of machinery.

The invention may also provide a combination wherein the cord is provided with an attachment opposed to the switch actuating element, the attachment being attached to the tractor, the piece of machinery including at least one guiding loop provided substantially adjacent the rotary drive shaft, the cord being inserted through the at least one guiding loops so as to be slidable relative to the loop, the cord defining a cord first portion extending between the switch assembly and piece of machinery and a cord second portion extending between the piece of machinery and the tractor, the cord first and second portions being substantially adjacent to the rotary drive shaft.

The invention may also provide a combination wherein the cord first and second portions are substantially parallel to each other.

The invention may also provide a combination wherein the cord extends along a substantially U-shaped path.

Advantageously, in some embodiments, the structural components of the various embodiments of the lanyard kill switch device, as described above, are manufacturable relatively inexpensively.

Also, when the housing includes the housing first and second portions are movable relative to each other, the force required to remove the switch actuating element from the actuating element receiving portion may be relatively small, even when the piece of machinery is not directly aligned with the direction of travel of the tractor and/or at an ideal distance from the tractor.

The present application claims priority from United Kingdom patent application 1518569.7 filed Oct. 20, 2015, the content of which is hereby incorporated by reference in its entirety.

Other objects, advantages and features of the present invention will become more apparent upon reading of the following non-restrictive description of some embodiments thereof, given by way of example only with reference to the accompanying drawings.

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Figure 3:
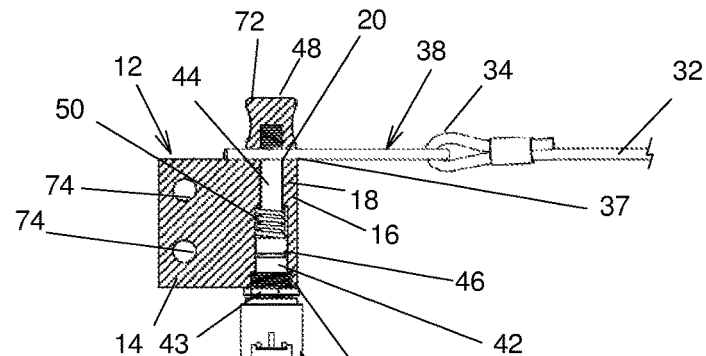
FIG. 3, in a side cross-sectional view, illustrates the kill switch of FIG. 1, here shown electrically coupled to the ignition switch of a power source and having a switch actuating element thereof holding an actuating member thereof in an actuating member first position.
Figure 4:
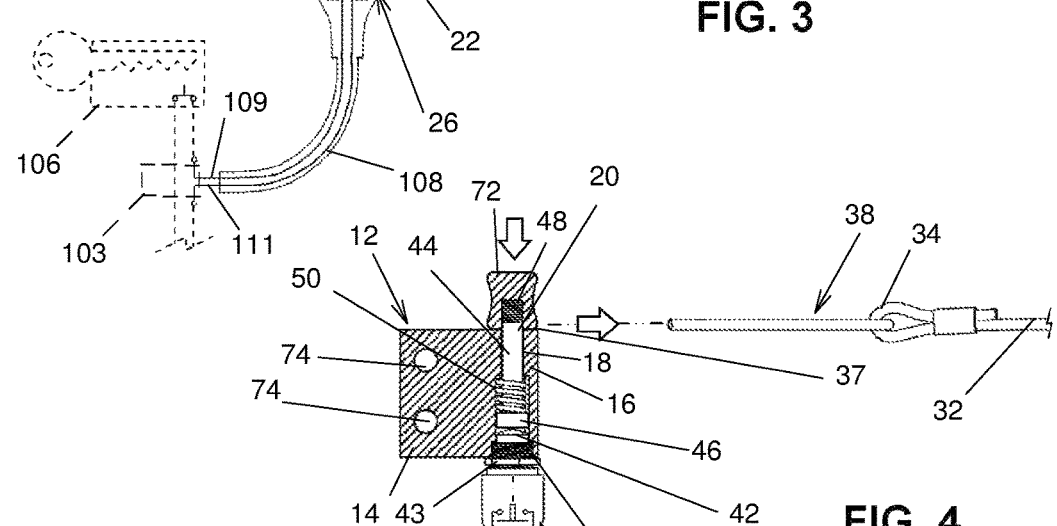
FIG. 4, in a side cross-sectional view, illustrates the kill switch of FIG. 1, here shown with the switch actuating element removed from the actuating member, which has allowed the latter to move to an actuating member second position.
Figure 5:
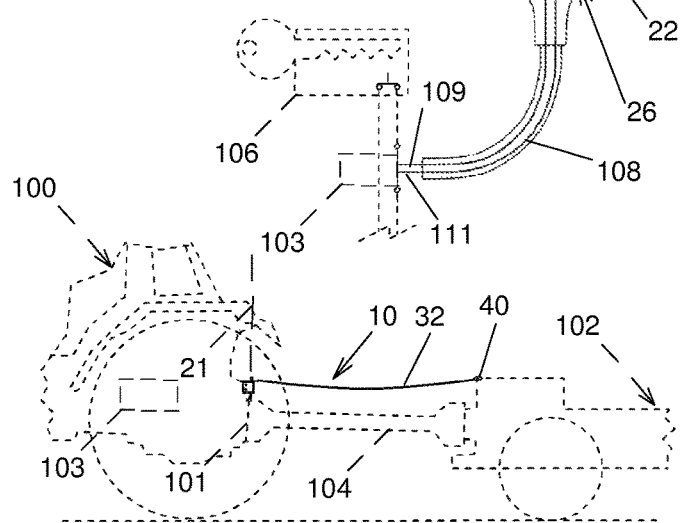
FIG. 5, in an environmental side elevational view, illustrates the kill switch of FIG. 1, here shown attached between a tractor and a piece of machinery, the latter being coupled to a power take-off (PTO) of the tractor.

FIGS. 1 to 5 inclusively illustrate various aspects of an embodiment, according to the present invention, of a kill switch 10. As illustrated in FIG. 5, the kill switch 10 is typically usable for disabling the operation of a tractor 100 operatively coupled to a piece of machinery 102 through a rotary drive shaft 104.

As illustrated in FIG. 5, the piece of machinery 102 may be typically represented by a wood chipper, a log saw, a continuous harvester, or the like, that is operatively coupled to the power take-off (PTO) 101 of the tractor 100 through through the rotary drive shaft 104. The power take-off 101 is powered by an engine (not shown in the drawings) of the tractor 100. the rotary drive shaft transmits power from the power take-off 101 to the piece of machinery 102.

The tractor 100 is provided with a controller 103 operable between an active state and an inactive state. In the active state, power is provided to the power take-off 101, and, in the inactive state, the power take-off 101 is unpowered. The controller 103 may control transfer of power from the engine to the power take-off 101 in any suitable manner. In some embodiments, the power take-off 101 is always powered when the engine is running, and the power take-off 101 becomes unpowered by simply powering down the engine. In other embodiments, a clutch may be selectively engaged and disengaged between the power take-off 101 and the engine to allow or prevent transfer of power from the engine to the power take-off. In some embodiments, in addition to removing power transfer from the engine, when the controller 103 enters the inactive state, a brake is activated to slow down and eventually stop the power take-off 101.

The controller 103 may include an analog circuit, a digital circuit, or both analog and digital circuits. The controller 103 is operative for switching from the active state to the inactive state upon reception of a kill electrical signal. In a simple embodiment, the controller 103 is simply a splice in a wire leading to an ignition switch 106 of the tractor 100, as seen for example in FIG. 3. When a conducting circuit is established across the splice, operation of the engine is allowed. In this embodiment, the kill signal is a change of the voltage across the splice. When this circuit is opened, the engine becomes unpowered. Thus signal in the context of the present invention should be given a very broad interpretation as meaning any variation in current, voltage, or both, among other possibilities.

However, more complex controllers 103 are also within the scope of the invention. In such controllers, the kill signal may be a step signal, from a nominal value to zero. Inversely, the kill signal may be passage of a voltage from zero to a nominal values. Transient signals, that start from an original value, to a transient value, to get back to the original value, are also examples of kill signals in accordance with the invention. Other more complex kill signals may be used.

Figure 1:
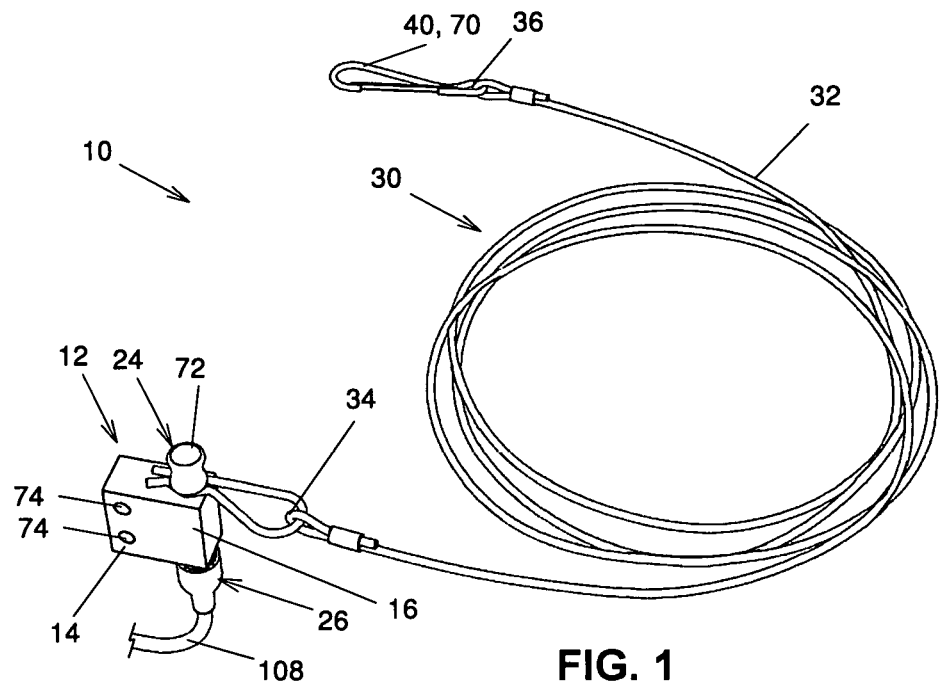
FIG. 1, in a perspective view, illustrates an embodiment of a kill switch, according to the present invention.

As seen for example in FIG. 1, the kill switch 10 generally comprises a switch assembly 24 and a control element 30. Referring to FIG. 3 for example, the switch assembly 24 includes an actuating element receiving portion 37, as described in further details hereinbelow. The switch assembly 24 also includes first and second electrical terminals 109 and 111 each connectable to the controller 103. The first and second electrical terminals 109 and 111 can be simply portions of electrical wires, or can include connectors or other structures allowing electrical connection. The switch assembly is operable between switch first and second configurations, seen respectively in FIGS. 3 and 4. When the switch assembly 24 moves from the switch first configuration to the switch second configuration with the switch assembly 24 operatively connected to the controller 103, variations in impedance between the first and second electrical terminals 109 and 111 are created, the variation in impedance causing the kill electrical signal to be provided to the controller 103.

These changes in impedance may be due to closing or opening of an electrical contact, which thus changes the resistance between the first and second electrical terminals 109 and 111. In other embodiments, a transient signal may be created by charging or discharging a capacitor when the switch assembly moves from the switch first configuration to the switch second configuration. Other manners known in the art of providing an electrical signal that can be interpreted as a kill signal are also within the scope of the invention. Also, in alternative embodiments, the switch assembly 24 may be an active component, and the kill signal may be actively generated, instead of being produced when the impedance of the switch assembly 24 varies.

The control element 30 includes a cord 32 securable to the piece of machinery 102 and to the switch assembly 24 so as to extend along the rotary drive shaft 104 in a substantially parallel and spaced apart relationship relative thereto. While remaining substantially parallel to the rotary drive shaft 104, the cord 32 may be slightly hanging to accommodate small movements thereof without activating the kill switch 10. The control element 30 also includes a switch actuating element 38 extending from the cord 32. The switch actuating element 38 is removably securable to the actuating element receiving portion 37.

When the switch assembly 24 is in the switch first configuration and the switch actuating element 38 is secured to the actuating element receiving portion 37, as seen in FIG. 3, the switch actuating element 38 maintains the switch assembly 24 in the switch first configuration. When the switch actuating element 38 is removed from the actuating element receiving portion 37. The switch assembly 24 moves to the switch second configuration. The switch actuating element 38 is removed from the actuating element receiving portion 37 by pulling with the cord 32. Thus, if for any reason a person or an object presses or pulls the cord 32 with enough force, the cord 32 will pull the switch actuating element 38 from the actuating element receiving portion 37, which will allow the switch assembly 24 to move to the switch second configuration and generate the kill signal. This will in turn stop power transmittal to the power take-off 101 and safely stop the rotary drive shaft 104 and operation of the piece of machinery 102. The cord 32 is for example substantially non-stretchable so that the switch actuating element 38 can be readily pulled from the actuating element receiving portion 37. For example, the length of the cord 32 varies by less than 1 percent when the forces required to remove the switch actuating element 38 from the actuating element receiving portion 37 are exerted. In other examples, this length varies by less than 0.1 percent under the same conditions.

A specific and non-limiting embodiment of the invention is as follows. The kill switch 10 includes a housing 12. The housing 12 includes a housing first portion 14 mountable to the tractor 100, and a housing second portion 16 extending from the housing first portion 14 and to which the switch assembly is mounted. For example, the housing second portion 16 defines a bore 18. The bore 18 defines substantially opposed bore first and second ends 20 and 22. A bore axis 21, illustrated for example in FIGS. 5 and 14, extends longitudinally along the bore 18. The bore 18 is open at the bore first end 20. The switch assembly 24 is mounted to the bore 18 and includes a switch element 26 electrically coupled the controller 103 through a suitable electrical cable 108, which defines the first and second electrical terminals 109 and 111.

A switch element 26 is provided at the bore second end 22 and extends electrically between the first and second electrical terminals 109 and 111. The switch element 26 is movable between open and closed configurations in which the first and second electrical terminals are respectively electrically disconnected from each other and connected to each other by the switch element 26. For example and non-limitingly, the switch element 26 is a push button switch.

Referring to FIG. 1, the control element 30 includes the cord 32, which defines a cord first end 34 and an opposed cord second end 36. The switch actuating element 38 is attached to the cord first end 34. The switch actuating element 38 is configured and sized for removably engaging the switch assembly 24 in the switch first configuration.

The control element 30 further includes an attachment 40 attached to the cord second end 36, and thus opposed to the switch actuating element 38, for attaching the cord second end 36 to a user selected portion of the piece of machinery 102. For example, as illustrated in FIG. 1, the attachment 40 is a snap hook 70, also known as a carabiner. Other known types of attachments are also usable.

Thus, with the housing first portion 14 attached to the tractor 100, the switch element 26 electrically coupled to the controller 103, the switch actuating element 38 releasably engaged with the switch assembly 24, and the attachment 40 attached to the piece of machinery 102 so as to have the cord 32 substantially linearly extending taut between the tractor 100 and the piece of machinery 102 (as illustrated in FIG. 5), an operator may pull on or fall across the cord 32 for disabling the operation of the power take-off 101 and, consequently, the rotary drive shaft 104 and the piece of machinery 102.

For example, when the switch element 26 is a push button switch, the switch element 26 may be mounted in the bore 18 at the bore second end 22 so as to have a pressable button 42 thereof oriented axially toward the bore first end 20.

Figure 2:
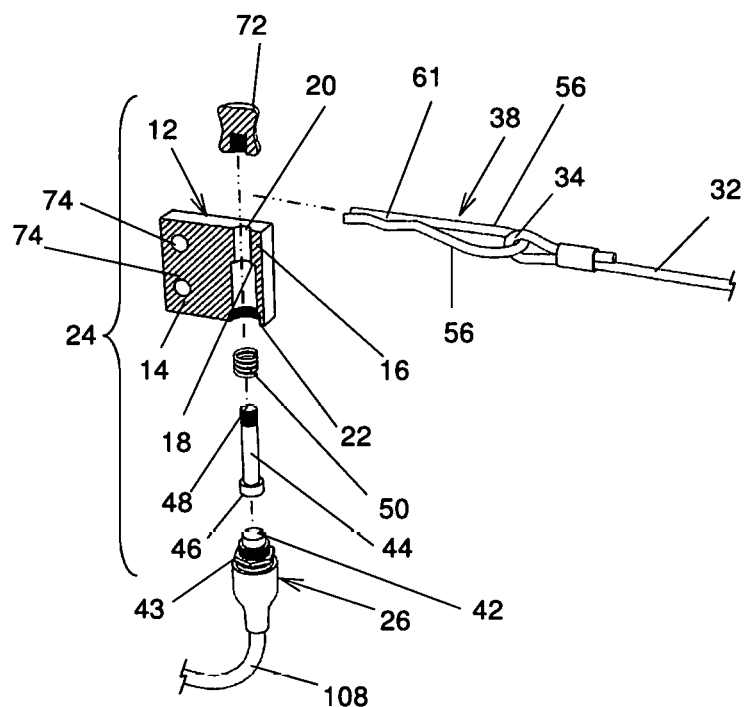
FIG. 2, in an exploded, partial, perspective cross-sectional view, illustrates the kill switch of FIG. 1.

As exemplified in FIGS. 2, 3 and 4, the switch element 26 may have a threaded portion engaged in a threaded bore portion extending inwardly into the bore 18 at the bore second end 22, and locked therein through a ring nut 43.

Furthermore, the switch assembly 24 further includes an actuating member 44. The actuating member 44 is inserted in the bore 18 and protrudes therefrom at the bore first end 20. For example, the actuating member 44 has an elongated configuration and is axially slidably engaged in the bore 18. The actuating member 44 defines an actuating member first end portion 46 abutting against the pressable button 42, and an actuating member second end portion 48 opposed thereto.

The actuating member 44 is axially movable along the bore 18 between actuating member first and second positions, seen respectively in FIGS. 3 and 4. The actuating member 44 is in the actuating member first and second positions when the switch assembly 24 is in the switch first and second configurations respectively. The switch element 26 either moves from the open configuration to the closed configuration or from the closed configuration to the open configuration when the actuating member 44 moves from the actuating member first position to the actuating member second position, depending on whether the switch element 26 is a default open or close circuit switch.

The actuating member second end portion 48 is at least slightly protruding axially from the bore first end 20 and is suitably configured and sized for releasably engaging the switch actuating element 38 when the switch assembly 24 is in the switch first configuration. The actuating member second end portion 48 thus defines the actuating element receiving portion 37, which is outside of the bore 18 in the actuating member first position.

In some embodiments, the actuating member 44 is biased towards the actuating member second position, the switch actuating element 38 extending across the bore 18 when the switch actuating element 38 is secured to the actuating element receiving portion 37. In these embodiments, removal of the switch actuating element 38 from the actuating element receiving portion 37 results in the actuating member 44 to move to the actuating member second position 38.

More specifically, for example, the switch assembly 24 further includes a biasing element 50 suitably configured and sized for biasing the actuating member 44 with sufficient force for actuating the push button switch 26 when the switch actuating element 38 is disengaged from the actuating element receiving portion 37, thus consequently biasing the switch assembly 24 towards the switch second configuration.

The biasing element 50 is for example a coil spring coaxially engaged on the actuating member 44, between a radial protuberance adjacent the actuating member first end portion 46 and an annular shoulder portion defined at a suitable position along the bore 18. Other equivalent configurations of a biasing elements 50 are also possible.

In some embodiments, as best illustrated in FIGS. 1, 2 and 3, in some embodiments, the switch actuating element 38 is a spring pin, also known as an R-spring pin, that is suitably configured and sized for releasably engaging the actuating element receiving portion 37 in a fork-like relation, across the bore 18, so as to retain the switch assembly 24 in the switch first configuration. The switch actuating element 38 then defines a pair of legs 56, the actuating element receiving portion 37 being inserted between the legs 56 when the switch actuating element 38 is operatively secured thereto. Such spring pins have at least one of the legs 56 that is curved, so that a recess 61 is formed between the legs 56. When the actuating element receiving portion 37 is inserted in the recess 61, the actuating element receiving portion 37 can be removed from the recess 61 only if a predetermined minimal pulling force is exerted on the spring pin to remove the switch actuating element 38 from the actuating element receiving portion 37.

Figure 6:
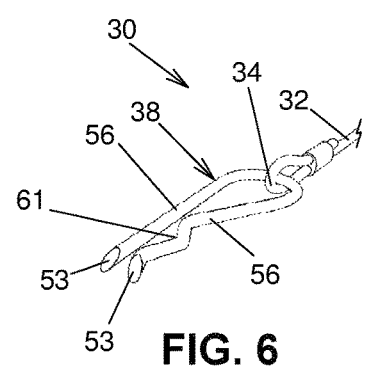
FIG. 6, in a perspective view, illustrates the switch actuating element shown in FIGS. 3 and 4.

In some embodiments, as illustrated in FIG. 6, the legs 56 each define a beveled free end 53. The beveled configuration is such that as the beveled free end 43 is inserted along the actuating element receiving portion 37, the latter is gradually moved against the force exerted by the biasing element 50. This configuration this facilitates this insertion with a single hand.

Figure 8:
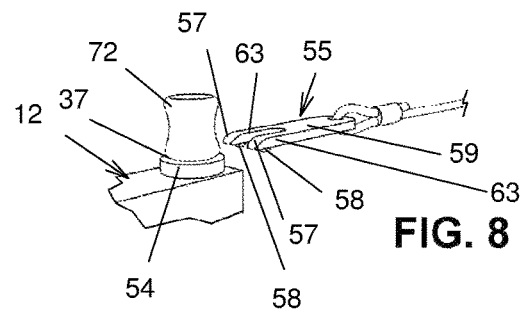
FIG. 8, in a partial perspective view, illustrates yet another embodiment of a kill switch according to the invention, here shown with the switch actuating element removed from the actuating member, which has allowed the latter to move to the actuating member second position.
Figure 9:
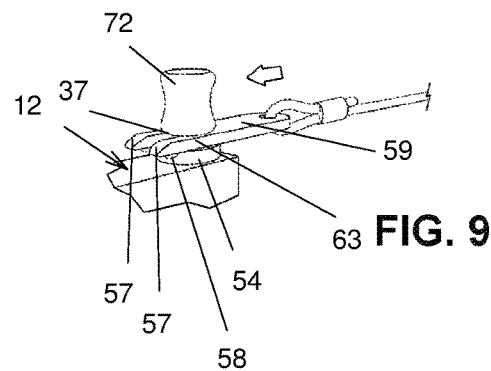
FIG. 9, in a partial perspective view, illustrates the kill switch of FIG. 8, here shown, with the switch actuating element secured to the actuating member, which maintains the latter in the actuating member first position.

Referring to FIGS. 8 and 9, in an alternate embodiment of the present invention, the housing 12 defines an annular engaging portion 54 around the bore first end 20. The annular engaging portion 54 may be formed in or otherwise attached to a top surface portion of the housing 12. An economic manufacturing option, as illustrated in the figures, may consist in that the annular engaging portion 54 is represented by a simple annular member such as metal flat washer that is spot welded or glued to the surface of the housing 12 using a suitable metal epoxy or the like. For engaging the annular engaging portion 54, there is provided an alternate embodiment of a switch actuating element 55.

The switch actuating element 55 has a substantially U-shaped configuration defining a pair of parallelly extending substantially rectilinear legs 63 extending from an actuating element main portion 59. The legs 63 are configured and sized for engaging in a fork-like relation opposed side portions of the actuating member 44. Each one of the leg 63 is terminated in a beveled configuration 57. At least one, and typically both, of the legs 63 is provided with a protrusion 58 extending therefrom. The actuating element receiving portion 37 is between the protrusion 58 and the actuating element main portion 59 when the switch actuating element 55 is operatively secured to the actuating element receiving portion 37. More specifically, each protrusion 58 may be suitably configured and sized for releasably engaging a portion of the annular engaging portion 54, as illustrated in FIG. 8, so that movements of the actuating member 44 against the biasing element 50 (not seen in FIGS. 8 and 9) are required to remove the legs 63 from the housing 12. Typically, each protrusion 58 is disposed at a sufficient distance from the tip end of its respective leg 63 so as to allow the beveled configuration 57 to initiate an engagement with an intersecting portion between the annular engaging portion 54 and the actuating member 44.

Thus, the annular engaging portion 54 and switch actuating element 55 combination may provide a convenient means for significantly facilitating the alignment and engaging of the switch actuating element 55 with the actuating member 44 using only one hand (e.g without having to pull on the actuating member 44 with the other hand), when compared to a conventional, or even a beveled, R-spring pin, as described further above.

The actuating element receiving portion 37 typically defines a substantially annular recess received between the legs 56 when the switch actuating element 38 or 55 is operatively secured to the actuating element receiving portion 37. This recess is for example created between the housing 12 a pull-knob 72 terminating the actuating member 44 outside of the housing 12. The pull-knob 72 typically has a diameter larger than the remainder of the actuating member 44. In addition to creating the actuating element receiving portion 37 cooperatively with the housing 12, the pull-knob 72 is usable for manually operating the actuating member 44, such as when it is required to pull on the actuating member 44 for engaging the switch actuating element 38 therewith.

Figure 7:
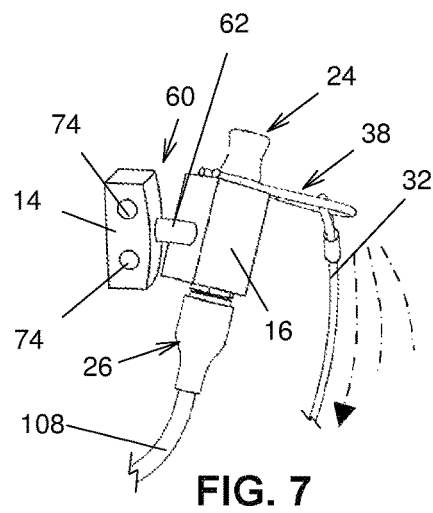
FIG. 7, in a perspective view, illustrates another embodiment of a kill switch according to the invention.

In an alternate embodiment of the present invention, as illustrated in FIG. 7, the housing first portion 14 and the housing second portion 16 cooperatively form a two part housing 60. The housing first and second portions 16 are spaced apart from each other and a link member 62 extends therebetween. The link member 62 is such that the housing first and second portions 14 and 16 are movable relative to each other.

For example, the link member 62 is substantially flexible. The link member 62 has a sufficient length dimension and is made of a resilient, yet sufficiently flexible material for allowing the housing second portion 16 to at least slightly move relative to the housing first portion 14 when the cord 32 is moved away from a straight line extending away from an axis joining housing first and second portions 14 and 16 when no forces are exerted thereon. This movement facilitates removal of the switch actuating element 38 from the actuating member 44 even when the cord 32 is pulled away therefrom at an angle. Such a link member 62 may be made of a sufficiently robust polymer, for example.

Figure 12:
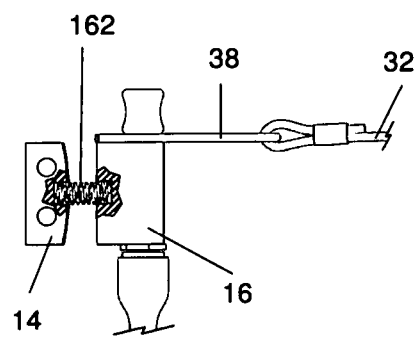
FIG. 12, in a partial cut away side view, illustrates yet another embodiment of a kill switch according to the invention.
Figure 13:
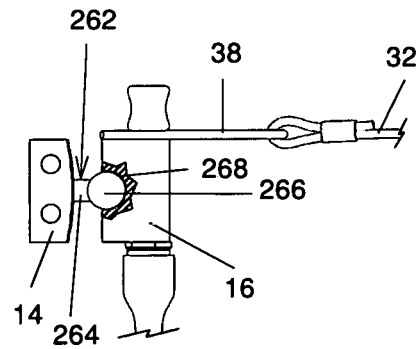
FIG. 13, in a partial cut away side view, illustrates yet another embodiment of a kill switch according to the invention.

As seen respectively in FIGS. 12 and 13, the link member 62 may be replaced by alternative link members 162 and 262. The link member 162 takes the form of a coil spring anchored in the housing first and second portions 14 and 16 at both ends thereof. The link member 262 is pivotally mounted to at least one of the housing first and second portions 14 and 16. In the embodiment shown in the drawings, the link member 262 is pivotally mounted to the housing second portion 16. To the effect, the link member 262 includes a shaft 264, which may be flexible or rigid, extending from the housing first portion 14 terminated by a ball 266 provided in a suitably shaped recess 268 in the housing second portion 16, thus forming a ball joint that allows the aforementioned pivotal moment.

In some embodiments, as illustrated in the figures, the housing first portion 14 defines at least one attachment bore 74 extending transversally therethrough for rigidly attaching the kill switch 10 to the tractor 100 using a corresponding number of screw members.

Figure 14:
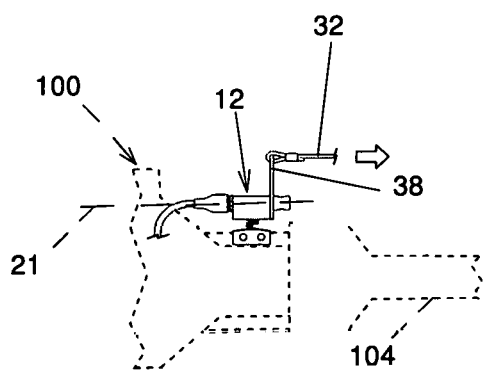
FIG. 14, in an environmental side elevation view, illustrates an other alternative manner of using the kill switches of FIGS. 1 to 13.

As seen in FIG. 5, the kill switch 10, and the other alternative kill switches described in the present document, may be secured to the tractor 100 with the bore axis 21 substantially vertical, and thus generally perpendicular to the rotary drive shaft 104. In other embodiments, as seen in FIG. 14, the kill switch 10, and the other alternative kill switches described in the present document, may be secured to the tractor 100 with the bore axis 21 substantially horizontal, and thus generally parallel to the rotary drive shaft 104. This latter configuration may be advantageous as the exact relative orientation of the housing 12 with the cord 32 may then be less critical than in other embodiments. In this embodiment, the housing 12 is mounted to the tractor 100 so that the bore axis 21 is substantially parallel to the rotary drive shaft 104. The cord 32 is offset from the bore axis 21 and extends generally parallel thereto substantially adjacent the switch actuating element 38.

Advantageously, the structural components of the various embodiments of the kill switch 10, as described above, may be made of a substantially rigid material, or combination of materials such as, for example, steel, aluminum, a suitable alloy, or like.

Yet, the kill switch 10 of the present invention is, in some embodiments, relatively inexpensive to manufacture and yet relatively robust. The kill switch 10 can then sustain the relatively harsh conditions often encountered daily on a farm.

Furthermore, in some embodiments, the resulting low cost kill switch 10 of the present invention is significantly more capable of being activated by a relatively light force, even after the initially stretched cord 32 has been significantly loosened between the tractor 100 and the piece of machinery 102. This simple characteristic can be lifesaving, for example, such as when having to detect the relatively light weight of the hand of an operator who suddenly fell ill or unconscious. Yet, although the particular configuration of the kill switch 10 of the present invention provides a device having a relatively high sensitivity in diverse situations, it does not generate false stops due to vibration and the likes.

Figure 10:
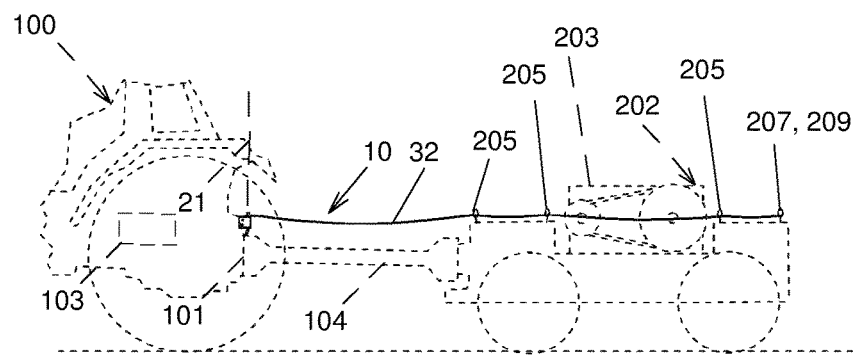
FIG. 10, in an environmental side elevation view, illustrates an alternative manner of using the kill switches of FIGS. 1 to 9.

With reference to FIG. 10, there is shown an other embodiment of the invention wherein the piece of machinery 202 includes moving parts 203 distinct from the rotary drive shaft 104 that are exposed to the environment through at least one of side, top and rear portions of the piece of machinery 202. In such embodiments, the cord 32 may also extend along the piece of machinery 202 along the moving parts 203. The cord 32 is attached to the piece of machinery 202 at an attachment location 207, for example using the attachment 40 or in any other suitable manner, with the cord 32 being movable relative to the piece of machinery 202 between the attachment location 207 and the actuating element receiving portion 37 (not shown in FIG. 10). The attachment location 207 is further away from the housing 12 along the cord 32 than the moving parts 203.

For example, the piece of machinery includes a guiding loop 205 adjacent the location where the rotary drive shaft 104 attaches thereto. The cord 32 is inserted through the guiding loop 205 so as to be slidable relative thereto. One or more additional guiding loops 205 may also be provided along the piece of machinery 202, the cord 32 being also inserted therethrough. The piece of machinery 202 also includes a machinery attachment 209, for example another loop, to which the attachment 40 may be secured. The machinery attachment 209 is at the attachment location 207. In such embodiments, when the cord 32 is relatively taut, the controller 103 may receive the kill signal if an event resulting in the cord 32 being pulled or pushed occurs adjacent the rotary drive shaft 104 or the moving parts 203.

Figure 11:
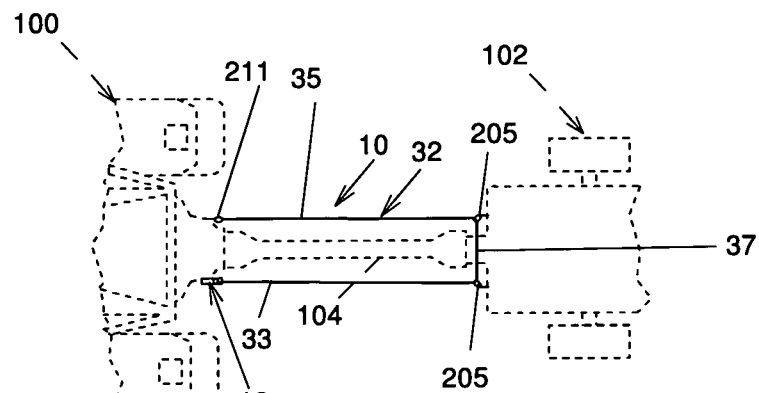
FIG. 11, in an environmental side elevation view, illustrates an other alternative manner of using the kill switches of FIGS. 1 to 9.

FIG. 11 illustrates yet another manner of using the kill switch 10, and the other kill switches described herein. The cord 32 is attached to the tractor 100, for example using the attachment 40 or in any other suitable manner, instead of being attached to the piece of machinery 102. For example, the attachment 40 is attached to a tractor attachment 211, for example a loop to which the attachment 40 may be secured. The piece of machinery 102 includes at least one guiding loop 205 provided substantially adjacent the rotary drive shaft 104. The cord 32 is inserted through the at least one guiding loop 205 so as to be slidable relative thereto. The cord 32 defines a cord first portion 33 extending between the switch assembly 24 and the piece of machinery 102 and a cord second portion 35 extending between the piece of machinery 102 and the tractor 100. The cord first and second portions 33 and 35 are substantially adjacent to the rotary drive shaft 104.

In a specific embodiment of the invention, the cord 32 extends along a substantially U-shaped path, for example centered on the rotary drive shaft 104 horizontally, and provided vertically slightly above the rotary drive shaft 104. In such embodiments, the cord 32 also includes a cord third portion 37 between the cord first and second portions 33 and 35. Two guiding loops 205 are provided on the piece of machinery 102, for example symmetrically located relative to the rotary drive shaft 204, so that the cord third portion 37 extends between these two guiding loops 205. In this embodiment, the cord first and second portions 35 and 37 may be substantially parallel to each other with the cord first portion 33 extending to one of the guiding loops 205 and the cord second portion 35 extending to the other guiding loops 205. In this embodiment, better protection from the rotary drive shaft 104 is provided.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A kill switch for a tractor, the tractor having a power take-off, the tractor being connected to a piece of machinery through a rotary drive shaft extending between the piece of machinery and the power take-off, the tractor being provided with a controller operable between an active state and an inactive state, wherein, in the active state, power is provided to the power take off, and, in the inactive state, the power take off is unpowered, the controller being operative for switching from the active state to the inactive state upon reception of a kill electrical signal, the kill switch comprising:

a switch assembly including an actuating element receiving portion and first and second electrical terminals each connectable to the controller, the switch assembly being operable between switch first and second configurations, wherein, when the switch assembly moves from the switch first configuration to the switch second configuration with the switch assembly operatively connected to the controller, variations in impedance between the first and second electrical terminals are created, the variation in impedance causing the kill electrical signal to be provided to the controller;

a control element, the control element including a cord securable to the piece of machinery and to the switch assembly so as to extend along the rotary drive shaft in a substantially parallel and spaced apart relationship relative thereto, and a switch actuating element extending from the cord, the switch actuating element being removably securable to the actuating element receiving portion;

wherein, when the switch assembly is in the switch first configuration and the switch actuating element is secured to the actuating element receiving portion, the switch actuating element maintains the switch assembly in the switch first configuration, and when the switch actuating element is removed from the actuating element receiving portion, the switch assembly moves to the switch second configuration, the switch actuating element being removable from the actuating element receiving portion by pulling with the cord; and wherein the switch assembly includes a housing, the housing including a housing first portion, a housing second portion and a link member extending therebetween, the housing first portion being mountable to the tractor and the housing second portion including the actuating element receiving portion, the link member being configured and sized so that the housing first and second portions are movable relative to each other.

2. The kill switch as defined in claim 1, wherein the link member is substantially flexible.

3. The kill switch as defined in claim 1, wherein the link member includes a coil spring.

4. The kill switch as defined in claim 1, wherein the link member is pivotally mounted to at least one of the housing first and second portions.

5. The kill switch as defined in claim 1, wherein the housing second portion includes a bore defining substantially opposed bore first and second ends, the bore being open at the bore first end, the switch assembly further including a switch element provided at the bore second end and extending electrically between the first and second electrical terminals, the switch element being movable between open and closed configurations in which the first and second electrical terminals are respectively electrically disconnected from each other and connected to each other by the switch element; and an actuating member inserted in the bore and protruding therefrom at the bore first end, the actuating member being axially movable along the bore between actuating member first and second positions, the actuating member being in the actuating member first and second positions when the switch assembly is in the switch first and second configurations respectively, the switch element either moving from the open configuration to the closed configuration or from the closed configuration to the open configuration when the actuating member moves from the actuating member first position to the actuating member second position;

the actuating member defining the actuating element receiving portion, the actuating element receiving portion being outside of the bore in the actuating member first position.

6. The kill switch as defined in claim 5, wherein the switch element is a push button switch actuated when the actuating member moves from the actuating member first position to the actuating member second position.

7. The kill switch as defined in claim 5, wherein the actuating member is biased towards the actuating member second position, the switch actuating element extending across the bore when the switch actuating element is secured to the actuating element receiving portion.

8. The kill switch as defined in claim 7, wherein the switch actuating element is configured and sized so that a predetermined minimal pulling force is required to remove the switch actuating element from the actuating element receiving portion.

9. The kill switch as defined in claim 8, wherein the switch actuating element includes a spring pin defining a pair of legs, the actuating element receiving portion being inserted between the legs when the switch actuating element is operatively secured thereto.

10. The kill switch as defined in claim 9, wherein the actuating element receiving portion defines a substantially annular recess received between the legs when the switch actuating element is operatively secured to the actuating element receiving portion.

11. The kill switch as defined in claim 9, wherein the spring pin is an R-spring pin.

12. The kill switch as defined in claim 9, wherein the legs each define a beveled free end.

13. The kill switch as defined in claim 8, wherein the switch actuating element includes an actuating element main portion and a pair of legs each extending from the actuating element main portion, each leg being substantially rectilinear, at least one of the legs being provided with a protrusion extending therefrom, the actuating element receiving portion being between the protrusion and the actuating element main portion when the switch actuating element is operatively secured to the actuating element receiving portion.

14. The kill switch as defined in claim 1, wherein the cord is substantially non-stretchable.

15. The kill switch as defined in claim 14, wherein the cord is provided with an attachment opposed to the switch actuating element, the attachment being removably attachable to the piece of machinery.

16. In combination:
a tractor, the tractor having a power take-off, the tractor being provided with a controller operable between an active state and an inactive state, wherein, in the active state, power is provided to the power take off, and, in the inactive state, the power take off is unpowered, the controller being operative for switching from the active state to the inactive state upon reception of a kill electrical signal;
a piece of machinery;
a rotary drive shaft extending between the piece of machinery and the power take-off for transmitting power from the power take-off to the piece of machinery; and
a kill switch including:
a switch assembly including an actuating element receiving portion and first and second electrical terminals each electrically connected to the controller, the switch assembly being operable between switch first and second configurations, wherein, when the switch assembly moves from the switch first configuration to the switch second configuration with the switch assembly operatively connected to the controller, the kill electrical signal is generated across the first and second electrical terminals; and
a control element, the control element including a cord secured to the piece of machinery and to the switch assembly so as to extend along the rotary drive shaft in a substantially parallel and spaced apart relationship relative thereto, and a switch actuating element extending from the cord, the switch actuating element being removably secured to the actuating element receiving portion;
wherein, when the switch assembly is in the switch first configuration and the switch actuating element is secured to the actuating element receiving portion, the switch actuating element maintains the switch assembly in the switch first configuration, and when the switch actuating element is removed from the actuating element receiving portion, the switch assembly moves to the switch second configuration, the switch actuating element being removable from the actuating element receiving portion by pulling with the cord; and
wherein the switch assembly includes a housing, the housing including a housing first portion, a housing second portion and a link member extending therebetween, the housing first portion being mounted to the tractor and the housing second portion including the actuating element receiving portion, the link member being configured and sized so that the housing first and second portions are movable relative to each other.

17. The combination as defined in claim 16, wherein the piece of machinery is selected from the set consisting of a wood chipper, a log saw and a continuous harvester.

18. The combination as defined in claim 16, wherein the cord is provided with an attachment opposed to the switch actuating element, the attachment being attached to the piece of machinery.

19. In combination:
a tractor, the tractor having a power take-off, the tractor being provided with a controller operable between an active state and an inactive state, wherein, in the active state, power is provided to the power take off, and, in the inactive state, the power take off is unpowered, the controller being operative for switching from the active state to the inactive state upon reception of a kill electrical signal;
a piece of machinery;
a rotary drive shaft extending between the piece of machinery and the power take-off for transmitting power from the power take-off to the piece of machinery; and
a kill switch including:
a switch assembly including an actuating element receiving portion and first and second electrical terminals each electrically connected to the controller, the switch assembly being operable between switch first and second configurations, wherein, when the switch assembly moves from the switch first configuration to the switch second configuration with the switch assembly operatively connected to the controller, the kill electrical signal is generated across the first and second electrical terminals; and a control element, the control element including a cord secured to the piece of machinery and to the switch assembly so as to extend along the rotary drive shaft in a substantially parallel and spaced apart relationship relative thereto, and a switch actuating element extending from the cord, the switch actuating element being removably secured to the actuating element receiving portion;

wherein, when the switch assembly is in the switch first configuration and the switch actuating element is secured to the actuating element receiving portion, the switch actuating element maintains the switch assembly in the switch first configuration, and when the switch actuating element is removed from the actuating element receiving portion, the switch assembly moves to the switch second configuration, the switch actuating element being removable from the actuating element receiving portion by pulling with the cord;

wherein the switch assembly includes a housing; and wherein the piece of machinery includes moving parts distinct from the rotary drive shaft exposed to the environment through at least one of side, top and rear portions of the piece of machinery, the cord further extending along the piece of machinery along the moving parts, the cord being attached to the piece of machinery at an attachment location with the cord being movable relative to the piece of machinery between the attachment location and the actuating element receiving portion, the attachment location being further away from the housing along the cord than the moving parts.

20. The combination as defined in claim 19, wherein the cord is inserted through at least one guiding loop extending from the piece of machinery between the attachment location and the switch assembly, the cord being slidable relative to the at least one guiding loop.

21. In combination:
a tractor, the tractor having a power take-off, the tractor being provided with a controller operable between an active state and an inactive state wherein, in the active state, power is provided to the power take off, and, in the inactive state, the power take off is unpowered, the controller being operative for switching from the active state to the inactive state upon reception of a kill electrical signal;

a piece of machinery;

a rotary drive shaft extending between the piece of machinery and the power take-off for transmitting power from the power take-off to the piece of machinery; and a kill switch including:
a switch assembly including an actuating element receiving portion and first and second electrical terminals each electrically connected to the controller, the switch assembly being operable between switch first and second configurations, wherein, when the switch assembly moves from the switch first configuration to the switch second configuration with the switch assembly operatively connected to the controller, the kill electrical signal is generated across the first and second electrical terminals; and a control element, the control element including a cord secured to the piece of machinery and to the switch assembly so as to extend along the rotary drive shaft in a substantially parallel and spaced apart relationship relative thereto, and a switch actuating element extending from the cord, the switch actuating element being removably secured to the actuating element receiving portion;

wherein, when the switch assembly is in the switch first configuration and the switch actuating element is secured to the actuating element receiving portion, the switch actuating element maintains the switch assembly in the switch first configuration, and when the switch actuating element is removed from the actuating element receiving portion, the switch assembly moves to the switch second configuration, the switch actuating element being removable from the actuating element receiving portion by pulling with the cord;

wherein the switch assembly includes a housing; and wherein the housing includes a bore defining substantially opposed bore first and second ends and a bore axis extending therebetween, the bore being open at the bore first end, the switch assembly further including a switch element provided at the bore second end and extending electrically between the first and second electrical terminals, the switch element being movable between open and closed configurations in which the first and second electrical terminals are respectively electrically disconnected from each other and connected to each other by the switch element; and an actuating member inserted in the bore and protruding therefrom at the bore first end, the actuating member being axially movable along the bore between actuating member first and second positions, the actuating member being in the actuating member first and second positions when the switch assembly is in the switch first and second configurations respectively, the switch element either moving from the open configuration to the closed configuration or from the closed configuration to the open configuration when the actuating member moves from the actuating member first position to the actuating member second position;

the actuating member defining the actuating element receiving portion, the actuating element receiving portion being outside of the bore in the actuating member first position;

the housing being mounted to the tractor so that the bore axis is substantially parallel to the rotary drive shaft;

the cord being offset from the bore axis and extending generally parallel thereto substantially adjacent the switch actuating element.

22. In combination:
a tractor, the tractor having a power take-off, the tractor being provided with a controller operable between an active state and an inactive state, wherein, in the active state, power is provided to the power take off, and, in the inactive state, the power take off is unpowered, the controller being operative for switching from the active state to the inactive state upon reception of a kill electrical signal;

a piece of machinery;

a rotary drive shaft extending between the piece of machinery and the power take-off for transmitting power from the power take-off to the piece of machinery; and a kill switch including:

a switch assembly including an actuating element receiving portion and first and second electrical terminals each electrically connected to the controller, the switch assembly being operable between switch first and second configurations, wherein, when the switch assembly moves from the switch first configuration to the switch second configuration with the switch assembly operatively connected to the controller, the kill electrical signal is generated across the first and second electrical terminals; and a control element, the control element including a cord secured to the piece of machinery and to the switch assembly so as to extend along the rotary drive shaft in a substantially parallel and spaced apart relationship relative thereto, and a switch actuating element extending from the cord, the switch actuating element being removably secured to the actuating element receiving portion;

wherein, when the switch assembly is in the switch first configuration and the switch actuating element is secured to the actuating element receiving portion, the switch actuating element maintains the switch assembly in the switch first configuration, and when the switch actuating element is removed from the actuating element receiving portion, the switch assembly moves to the switch second configuration, the switch actuating element being removable from the actuating element receiving portion by pulling with the cord; and wherein the cord is provided with an attachment opposed to the switch actuating element, the attachment being attached to the tractor, the piece of machinery including at least one guiding loop provided substantially adjacent the rotary drive shaft, the cord being inserted through the at least one guiding loop so as to be slidable relative to the loop, the cord defining a cord first portion extending between the switch assembly and the piece of machinery and a cord second portion extending between the piece of machinery and the tractor, the cord first and second portions being substantially adjacent to the rotary drive shaft.

23. The combination as defined in claim 22, wherein the cord first and second portions are substantially parallel to each other.

24. The combination as defined in claim 23, wherein the cord extends along a substantially U-shaped path.

* * * * *